United States Patent
Stockert et al.

(10) Patent No.: US 12,143,267 B2
(45) Date of Patent: Nov. 12, 2024

(54) NETWORK OPTIMIZATION FOR HYBRID QUANTUM-CLASSICAL NETWORKS

(71) Applicants: AT&T Intellectual Property I, L.P., Atlanta, GA (US); AT&T Mobility II LLC, Atlanta, GA (US)

(72) Inventors: Mark K. Stockert, San Antonio, TX (US); Thomas J. Routt, Sequim, WA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 92 days.

(21) Appl. No.: 17/813,848

(22) Filed: Jul. 20, 2022

(65) Prior Publication Data

US 2024/0031224 A1   Jan. 25, 2024

(51) Int. Cl.
*H04L 41/0816* (2022.01)
*G06N 10/40* (2022.01)
*H04B 10/70* (2013.01)

(52) U.S. Cl.
CPC ......... *H04L 41/0816* (2013.01); *G06N 10/40* (2022.01); *H04B 10/70* (2013.01)

(58) Field of Classification Search
CPC ..... H04B 10/70; H04L 9/0852; H04L 9/0855; H04L 41/0816; G06N 10/40; G06N 10/00; G06N 10/20; G06N 10/60; G06N 10/70; G06N 10/80; G06F 30/337
See application file for complete search history.

(56) References Cited

U.S. PATENT DOCUMENTS

| | | | | |
|---|---|---|---|---|
| 10,439,867 | B2 * | 10/2019 | Wohlert | H04L 67/34 |
| 2022/0084085 | A1 * | 3/2022 | Rigetti | H04L 12/1403 |
| 2023/0077665 | A1 * | 3/2023 | Kuttimalai | G06F 17/11 |
| | | | | 700/90 |
| 2023/0110591 | A1 * | 4/2023 | Routt | G06F 15/16 |
| | | | | 706/12 |
| 2023/0289643 | A1 * | 9/2023 | Jain | G06Q 10/04 |
| 2023/0361883 | A1 * | 11/2023 | Routt | G16Y 40/20 |
| 2024/0070512 | A1 * | 2/2024 | Cao | G06N 10/60 |

OTHER PUBLICATIONS

Stockert et al., "System and Method for Managing Communication Networks with Quantum Blockchains," U.S. Appl. No. 17/498,229, filed Oct. 21, 2021.

* cited by examiner

*Primary Examiner* — Hibret A Woldekidan

(57) ABSTRACT

A method performed by a processing system including at least one processor includes calculating a quantum network relative performance metric for a current configuration of a hybrid quantum-classical telecommunications network, identifying a proposed new configuration for the hybrid quantum-classical telecommunications network, calculating the quantum network relative performance metric for the proposed new configuration of the hybrid quantum-classical telecommunications network, and implementing the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network.

20 Claims, 6 Drawing Sheets

NETWORK OPTIMIZATION FOR HYBRID QUANTUM-CLASSICAL NETWORKS

The present disclosure relates generally to cellular networks, and relates more particularly to devices, non-transitory computer-readable media, and methods for optimizing fifth generation/sixth generation and next-generation hybrid quantum-classical networks.

BACKGROUND

Quantum computation stores information as quantum bits (or "qubits"), which are quantum generalizations of classical bits. Qubits can be represented as a two-to-n-level quantum system based on, for example, electronic/photonic spin and polarization, where: (1) the state of a qubit is a phase vector $|\psi\rangle$ (mathematical description of a quantum system, a complex-valued probability amplitude and the probabilities for possible results of measurements made on the system) in a linear superposition of states such as $|\psi\rangle = \alpha|0\rangle + \beta|1\rangle$; (2) state vectors $|0\rangle$ and $|1\rangle$ are physical eigenstates of the logical observable and form a computational basis spanning a two-to-n dimensional Hilbert space (i.e., inner product space of two or more vectors, equal to the vector inner product between two or more matrix representations of those vectors containing $|\psi\rangle$); and (3) a collection of qubits comprises a multi-particle quantum system.

Quantum computation can pursue all computational trajectories simultaneously based on quantum superposition (i.e., integration of all states between 0 and 1), whereas classical computation proceeds in a serial fashion. Quantum logic gates form basic quantum circuits that operate on qubits, are reversible with a few exceptions (unlike classical logic gates), and are unitary operators, described as unitary matrices relative to basis states. Quantum algorithms utilize quantum circuit gates to manipulate states of quantum systems, just as classical algorithms utilize classical logic gates (represented as a sequence of Boolean gates) to perform classical (non-quantum) computational operations.

SUMMARY

The present disclosure broadly discloses methods, computer-readable media, and systems for optimizing fifth generation/sixth generation and next-generation hybrid quantum-classical networks. In one example, a method performed by a processing system including at least one processor includes calculating a quantum network relative performance metric for a current configuration of a hybrid quantum-classical telecommunications network, identifying a proposed new configuration for the hybrid quantum-classical telecommunications network, calculating the quantum network relative performance metric for the proposed new configuration of the hybrid quantum-classical telecommunications network, and implementing the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network.

In another example, a non-transitory computer-readable medium may store instructions which, when executed by a processing system including at least one processor, cause the processing system to perform operations. The operations may include calculating a quantum network relative performance metric for a current configuration of a hybrid quantum-classical telecommunications network, identifying a proposed new configuration for the hybrid quantum-classical telecommunications network, calculating the quantum network relative performance metric for the proposed new configuration of the hybrid quantum-classical telecommunications network, and implementing the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network.

In another example, a device may include a processing system including at least one processor and a non-transitory computer-readable medium storing instructions which, when executed by the processing system, cause the processing system to perform operations. The operations may include calculating a quantum network relative performance metric for a current configuration of a hybrid quantum-classical telecommunications network, identifying a proposed new configuration for the hybrid quantum-classical telecommunications network, calculating the quantum network relative performance metric for the proposed new configuration of the hybrid quantum-classical telecommunications network, and implementing the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
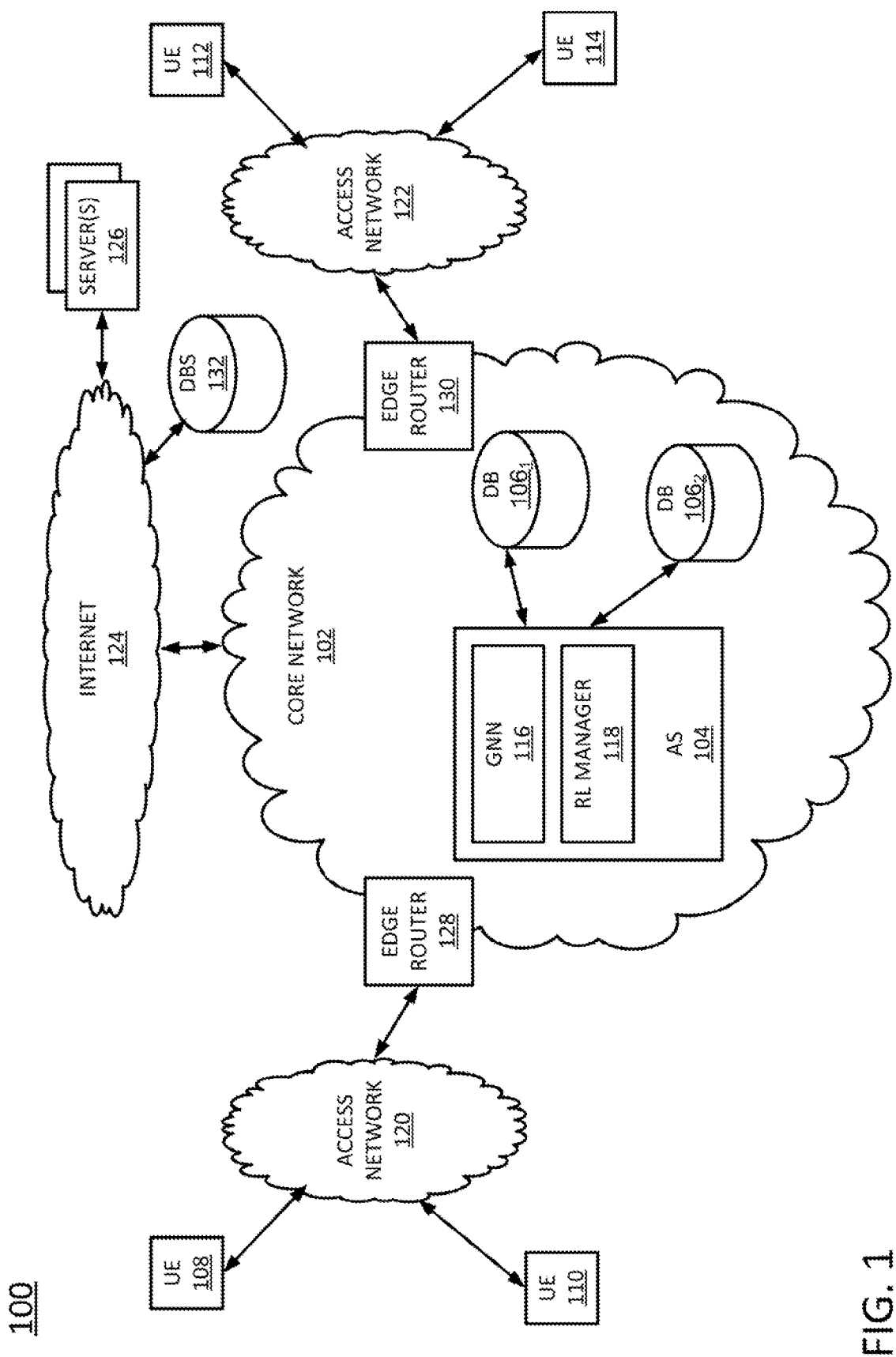
FIG. 1 illustrates an example system in which examples of the present disclosure for optimizing fifth generation/sixth generation and next-generation hybrid quantum-classical networks may operate.

The present disclosure broadly discloses methods, computer-readable media, and systems for optimizing fifth generation/sixth generation and next-generation hybrid quantum-classical networks. As discussed above, quantum computation stores information as quantum bits (or "qubits"), which are quantum generalizations of classical bits. Qubits can be represented as a two-to-n-level quantum system based on, for example, electronic/photonic spin and polarization, where: (1) the state of a qubit is a phase vector $|\psi\rangle$ (mathematical description of a quantum system, a complex-valued probability amplitude and the probabilities for possible results of measurements made on the system) in a linear superposition of states such as $|\psi\rangle = \alpha|0\rangle + \beta|1\rangle$; (2) state vectors $|0\rangle$ and $|1\rangle$ are physical eigenstates of the logical observable and form a computational basis spanning a two-to-n dimensional Hilbert space (i.e., inner product space of two or more vectors, equal to the vector inner product between two or more matrix representations of those vectors containing $|\psi\rangle$); and (3) a collection of qubits comprises a multi-particle quantum system.

Quantum computation can pursue all computational trajectories simultaneously based on quantum superposition (i.e., integration of all states between 0 and 1), whereas classical computation proceeds in a serial fashion. Quantum logic gates form basic quantum circuits that operate on qubits, are reversible with a few exceptions (unlike classical logic gates), and are unitary operators, described as unitary matrices relative to basis states. Quantum algorithms utilize quantum circuit gates to manipulate states of quantum systems, just as classical algorithms utilize classical logic gates (represented as a sequence of Boolean gates) to perform classical (non-quantum) computational operations.

Hybrid quantum-classical networks operate in parallel, where the classical networks and the quantum networks may be topologically identical. Quantum routers have been designed and prototyped, and, though not yet commercially available, it is not unreasonable to assume that quantum routers and repeaters will be commercially available in the near term given the pace of innovation in the quantum technology field. Initial quantum networks have been built and are in use for quantum key distribution (QKB) and as research test beds.

Thus, although hybrid quantum-classical networks have not yet reached the state of the art where network management systems have been designed or built, early work is progressing on network elements and protocols for communication between nodes. Hybrid quantum-classical network technology will reach a point in a few years where the first commercial hybrid quantum-classical networks will be built and begin to carry traffic. The performance and security advantages of hybrid quantum-classical networks may prove advantageous to public safety agencies and first responders, who rely on highly available, low-latency communications and network infrastructures and location-based situational awareness when responding to routine, emergency, and disaster scenarios in real time.

Hybrid quantum-classical networks can transmit and store entangled qubits, among other unique quantum properties. Additionally, hybrid quantum-classical networks are subject to quantum errors in the network, such as loss, dephasing, depolarization, and the like. Sixth generation (6G) mobile networks will increasingly require quantum and hybrid quantum-classical communications to interconnect a plurality of end-to-end quantum and hybrid quantum-classical networked application resources (e.g., application programs, application programming interfaces or APIs, application servers, security servers, data repositories/lakes, routers, switches, load balancers, links, and the like).

Emerging 6G applications for tactile networks, Internet of Things (IoT), digital twins, and the like will greatly expand network traffic demand during wide area disasters and emergencies. 6G networks will require hyper-synchronization of multiple parallel flows to multiple devices supporting synchronized parallel media streams that originate from multiple network endpoints and midpoints.

Most emergencies occur without warning and almost always require rapid and seamless response with little to no room for error. Timely, multidisciplinary, coordinated responses across agency lines are critical to protecting communities and citizens. Whether the emergency is a fire, a natural disaster (e.g., a hurricane, an earthquake, a forest fire, a flood, a commercial disaster, or the like), a vehicular accident, a search and rescue operation, an act of terrorism, or pursuit of criminal suspects, highly available, low latency networks, real-time data collection, real-time three-dimensional location-based situational awareness, and actionable analytics are needed to enable successful response by first responders.

During wide area disasters or emergencies, there is a potentially large demand for network (e.g., fifth generation or 5G/6G and next-generation) capacity. The capacity demanded during such situations may far exceed the engineered network capacity. Moreover, damage to the network infrastructure from the disaster or emergency may further reduce network capacity. Thus, rationed capacity with priority services and traffic throttling (e.g., overload controls, network management, and/or other techniques) may be implemented locally in areas where the network capacity struggles to meet the demand. Hybrid quantum-classical networks will require management and optimization to perform optimally in such situations.

Examples of the present disclosure optimize the performance of 5G/6G and next-generation hybrid quantum-classical networks based on respective weighting profiles for quantum network quality of service (QNQoS) performance metrics and optimize services based on service type parameters, services priority, route, and cost. Machine learning may be used to determine paths through the hybrid network based on end-to-end hybrid QNQoS services priority and cost. In further examples, a quantum graph blockchain database may store network performance and other metrics. These and other aspects of the present disclosure are discussed in greater detail below in connection with the examples of FIGS. 1-5.

To further aid in understanding the present disclosure, FIG. 1 illustrates an example system 100 in which examples of the present disclosure for optimizing fifth generation/sixth generation and next-generation hybrid quantum-classical networks may operate. The system 100 may comprise all or part of a 5G/6G (and/or next-generation) quantum-classical hybrid network. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, one or more databases (DBs) $106_1$-$106_2$ (hereinafter individually referred to as a "DB 106" or collectively referred to as "DBs 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3 rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 500 depicted in FIG. 5, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 5:
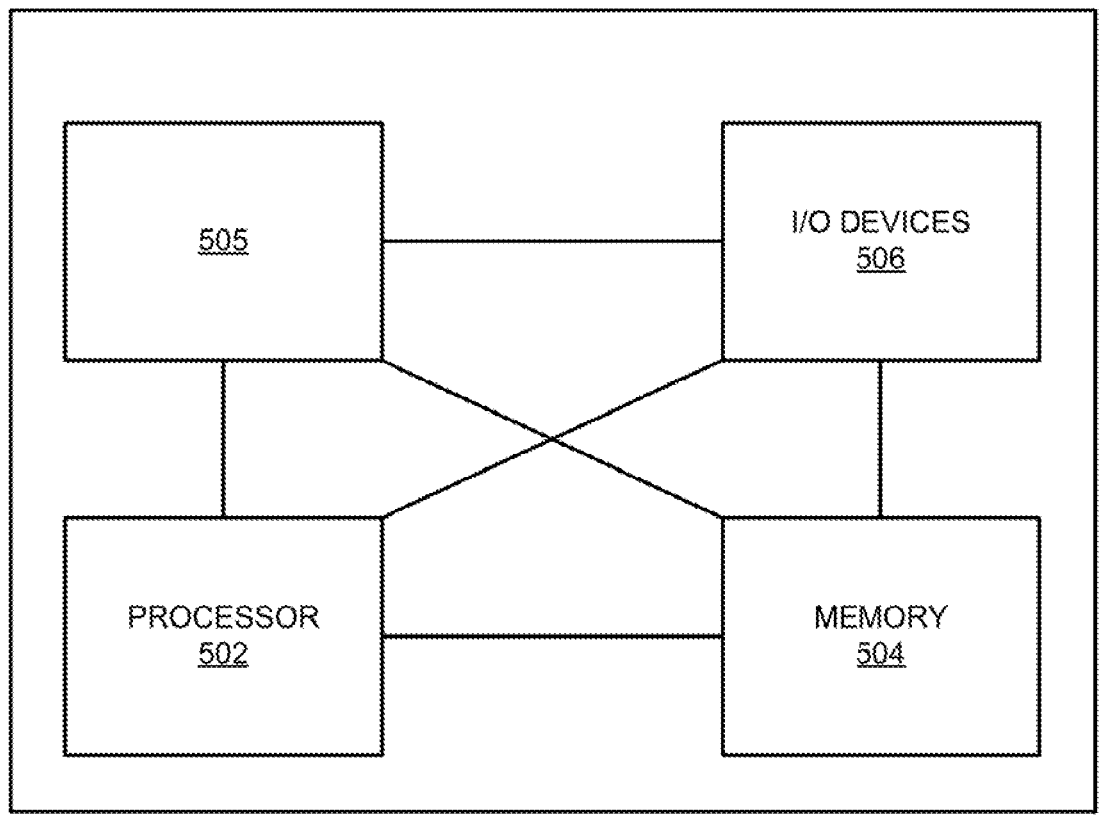
FIG. 5 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for optimizing fifth generation/sixth generation and next-generation hybrid quantum-classical networks, as described herein. The AS 104 may comprise one or more physical devices, e.g., one or more computing systems or servers, such as computing system 500 depicted in FIG. 5, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, the AS 104 may be configured to optimize fifth generation/sixth generation and next-generation hybrid quantum-classical networks. To this end, the AS 104 may comprise a quantum-classical graph neural network (GNN) 116 that models the system 100 (or a portion of the system 100) as a graph and a reinforcement learning (RL) manager 118 that functions as a decentralized resource control and allocation engine for the system 100. Details of the GNN 116 and RL manager 118 are discussed further below.

DBs 106 and/or DB 132 may include a quantum-classical blockchain database and a policy database. For instance, DB $106_1$ may comprise the quantum-classical blockchain database, while DB $106_2$ may comprise the policy database. Alternatively, the quantum-classical blockchain database and the policy database may comprise components of a single, common database.

In one example, the quantum-classical blockchain database (e.g., DB $106_1$) may store quantum classical network data, including network topology, tunable performance parameters, and/or other data. The quantum-classical blockchain database may utilize graph structures for semantic queries with nodes, edges, and properties to represent and store data. Nodes in the hybrid quantum-classical network may be represented as nodes in the quantum-classical blockchain database, and network connections may be represented as edges in the quantum-classical blockchain database.

Graph databases lend themselves to efficiently representing network topologies. Querying relationships within a graph database is a rapid process, because the relationships are perpetually stored within the database (i.e., the structure of the database models the network topology). Blockchains are distributed in secure databases that store data in a ledger. A graph blockchain has lower latency and compute requirements that a non-blockchain graph. In the present example, the graph blockchain database is hybrid quantum-classical in nature due to the fact that some operations and optimizations may be performed on a classical computer.

In one example, the policy database (e.g., DB $106_2$) may store policies for network traffic, which include rules that guide evaluation of proposed network configurations. Policies may be specified by one or more data modeling languages (e.g., topology and orchestration specification for cloud applications (TOSCA), yet another next generation (YANG), and/or other languages) and may also include engineering rules and operational constraints for a network or networks. Policies may include rules for relative weights for services for different parts of the hybrid quantum-classical network, sub-networks, and/or for a plurality of users of the hybrid quantum-classical network (e.g., first responders, enterprise, etc.). Quantum network policies may include rules for fidelity, purity, quantum entanglement, super dense coding, memory, loss, connection time, priority, topology, transport medium, access medium, and/or other requirements. Policies may also specify conditional rules with which to update or change network or sub-network configurations.

The hybrid quantum-classical network may comprise an entire network or may comprise sub-nets of a larger network (e.g., local, regional, national, international, satellite, and/or other sub-nets). Network paths may include 6G RAN access nodes and user endpoints (UEs) with quantum channels. Policies for public safety and first responders may include higher priority, low-latency access communications, network infrastructure, and location-based situational awareness. Policies may include rules for emerging 5G, 6G, and/or next-generation applications related to tactile networks, Internet of Things (IoT), and digital twins.

In one example, one or more of the DB(s) 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for optimizing fifth generation/sixth generation and next-generation hybrid quantum-classical networks, as described herein. One example method for optimizing fifth generation/sixth generation and next-generation hybrid quantum-classical networks is described in greater detail below in connection with FIG. 2.

Referring back to the AS 104, the quantum-classical GNN 116 may utilize a graph structure and node features to learn and model the hybrid quantum-classical network as a plurality of nodes, edges, and graphs. Graphs can be represented as matrices (e.g., adjacency, incidence, etc.), which fits well with deep learning matrix calculus.

The quantum-classical GNN 116 represents an efficient means of estimating end-to-end network performance metrics for a given topology, routing, and traffic measurements in the hybrid quantum-classical network. In one example, normalized quantum key performance indicators (QKPIs) for the hybrid quantum-classical network, along with QKPIs from networks having similar topologies and performance metrics, may be utilized as model training data for the quantum-classical GNN 116. The represented network nodes, edges, graphs, parameters, and weights may be inputs to the quantum-classical GNN 116.

The quantum-classical GNN 116 may include a quantum computation application and may be capable of determining optimized network performance parameters more rapidly than classical computers. Quantum computing of graph adjacency matrices is more time- and space-efficient than using classical computers. The quantum-classical GNN 116 may run until an approximate optimal network configuration is reached. If a quantum network relative performance (QNRP) metric (discussed in greater detail below) for a proposed new network configuration is greater than the QNRP of the existing network configuration, then the quantum-classical GNN may initiate changes to the network configuration that are consistent with the proposed new configuration.

In one example, the quantum-classical RL manager 118 functions as a decentralized network resource control and allocation engine. Reinforcement learning is actuated from feedback of KPIs from the hybrid quantum-classical network before, during, and after application of configuration parameter changes (i.e., as a reward function). A distributed RL agent may be located at router nodes in the hybrid quantum-classical network. The RL agents may learn optimal network behavior through reinforced rewards and penalties. Quantum reinforcement learning may extend the agent-network interaction quantum mechanically, where a plurality of network state identities is represented in superposition.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, all of the UE devices 108, 110, 112, and 114 may communicate with the core network 102 via different access networks, or only user endpoint devices 110 and 112 may communicate with the core network 102 via different access networks, and so forth. Thus, these and other modifications are all contemplated within the scope of the present disclosure.

In one example, a network operator of a hybrid quantum-classical and/or legacy 5G/6G/next-generation network may use the disclosed network optimization system to offer quantum computing as a service (QCaaS), quantum networking as a service (QNaaS), or other types of services. For instance, one type of service that could be implemented is security as a service (SaaS), whereby a quantum network offers provable security through an essentially non-interruptible, entangled qubit distribution service and quantum key distribution.

Another type of service that could be implemented is quantum network cloud computing as a service. In this case, network customers would not need to own, build, or maintain their own quantum network infrastructure. The network optimization system could dynamically adjust weights for different services and customer priority, location, and the like to manage network traffic using the quantum-classical RL manager 118 discussed in connection with FIG. 1. This dynamic weighting could be controlled by the optimizer function. Customer records for billing, service types, service guarantees, priority, and the like could be stored in the quantum-classical blockchain database (e.g., DB $106_1$ of FIG. 1).

Hybrid quantum-classical networks may be fragile and prone to loss of entanglement, super dense coding, and other network disruptions when failures occur or upon environmental interaction. The quantum-classical GNN 116 of FIG. 1 could store network state information, track network changes, store tunable network parameters, and store a fault-tolerant graphical backup map of the hybrid quantum-classical network. The quantum-classical RL manager 118 could repair, restore, and/or rebuild disrupted network routes, restore connectivity, re-route traffic around disrupted nodes, restore entanglement, and restore QCaaS and QNaaS functionality.

Additionally, alternate network routing could be derived from network state maps generated by the quantum-classical GNN 116. Hybrid quantum-classical network traffic loads could be monitored and adjusted by the quantum-classical RL manager 118 based on learned traffic patterns and models. The quantum-classical RL manager could control network loads that exceed capacity by throttling and/or re-routing traffic. The quantum-classical RL manager 118 could predict future traffic and generate new network routes and plans.

Figure 2:
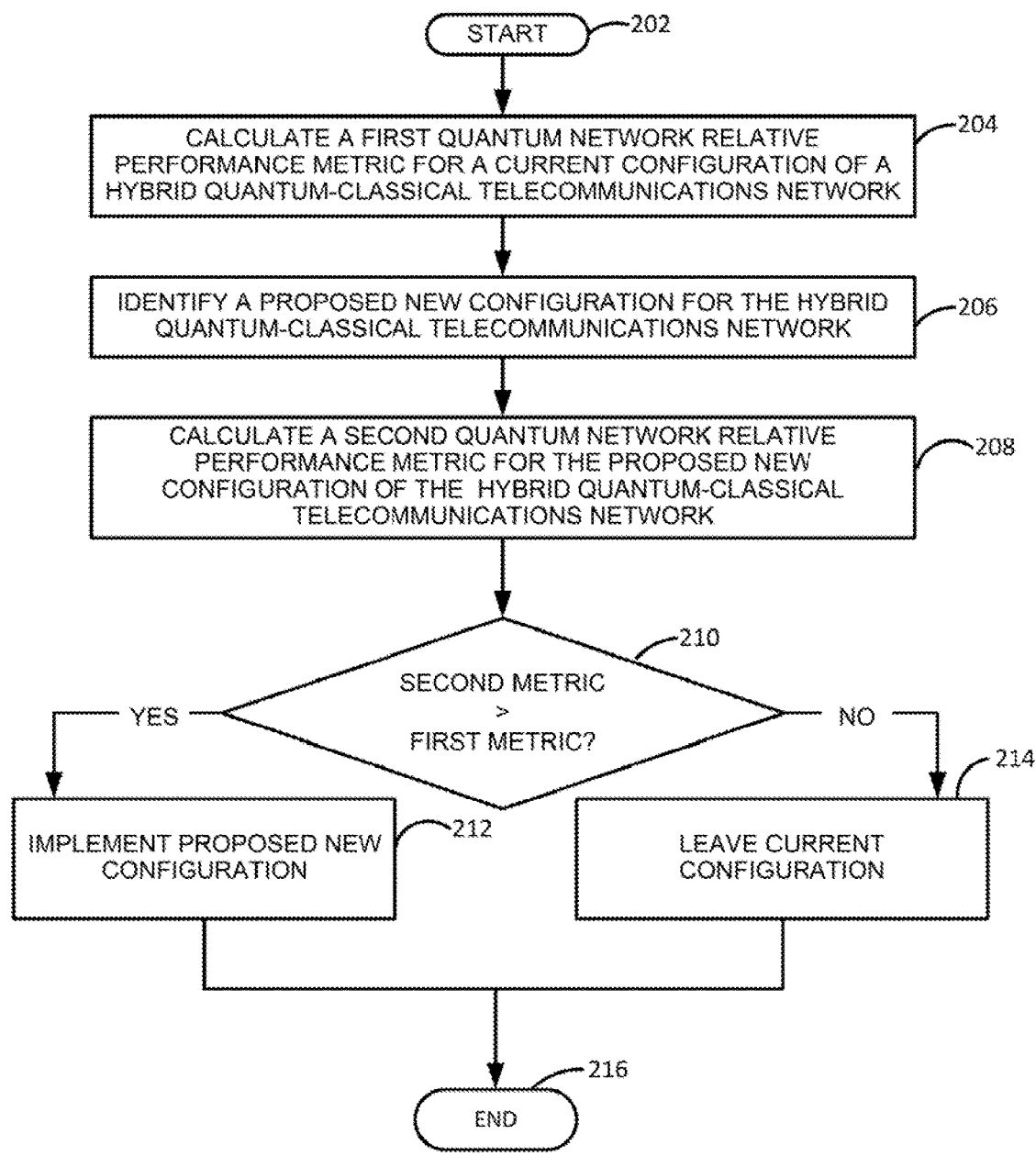
FIG. 2 illustrates a flowchart of an example method for optimizing fifth generation/sixth generation and next-generation hybrid quantum-classical networks, in accordance with the present disclosure.

FIG. 2 illustrates a flowchart of an example method 200 for optimizing a hybrid quantum-classical network, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 500, and/or a processing system 502 (e.g., having at least one processor) as described in connection with FIG. 5 below. For instance, the computing device 500 may represent at least a portion of the AS 104 in accordance with the present disclosure. For illustrative purposes, the method 200 is described in greater detail below in connection with an example performed by a processing system, such as processing system 502.

The method 200 begins in step 202 and proceeds to step 204. In step 204, the processing system may calculate a quantum network relative performance (QNRP) metric for a current configuration of a hybrid quantum-classical telecommunications network, e.g., utilizing a first set of configuration parameter values associated with the current configuration of the hybrid quantum-classical telecommunications network. In one example, the hybrid quantum-classical telecommunications network may comprise a sub-network of a larger telecommunications network. In one example, the configuration parameters associated with the first set of configuration parameter values may relate to at least one of: requirements per service, quantum fidelity requirements, quantum purity requirements, quantum entanglement requirements (e.g., wherein when two particles in proximity in a shared quantum state, and the quantum state of one particle changes when the particles are physically separated, the quantum state of the other particle will also instantly change), quantum memory requirements, quantum loss requirements, average connection time between nodes, priority requirements, network topology that dynamically changes, transport medium per path (e.g., satellite free-space in a vacuum, optical fiber, etc.), access medium (e.g., 6G free spaces optics such as LiFi, microwave, etc.), time dependent or time independent quantum super dense coding requirements, and/or other functions of the hybrid quantum-classical telecommunications network.

In one example, the QNRP metric is based on respective weighting profiles associated with: (1) quality of service (QoS); (2) applications and services; (3) priority; and (4) costs and other network parameters. For instance, in one example, the QNRP may be calculated as the sum of the weighted quantum network service relative performance (QNSRP) metrics for n services according to:

$$QNRP = \Sigma(QNSRP_{S1} * W_{S1}) \ldots (QNSRP_{Sn} * W_{Sn}) \qquad \text{(EQN. 1)}$$

where $QNSRP_i$ is the QNSRP of the $i^{th}$ service and $W_i$ is the weight applied to the $i^{th}$ service of the n services.

The QNSRP for a service may be calculated as the sum of all quantum path relative performance (QPRP) metrics for the service according to:

$$QNSRP = \Sigma QPRP_{P1 \ldots Pm} \qquad \text{(EQN. 2)}$$

where $QPRP_{pi}$ is the QPRP metric of the $i^{th}$ path of m quantum paths associated with a service.

The QPRP metric for a quantum path may be calculated as the sum of all quantum component relative performance (QCRP) metrics for the path according to:

$$QPRP = \Sigma QCRP_{C1 \ldots Co} \qquad \text{(EQN. 3)}$$

where $QCRP_{Ci}$ is the QCRP metric of the $i^{th}$ component of o quantum components on a path.

The QCRP metric for a quantum component may be calculated as the sum of all quantum relative performance (QRP) metrics for the component according to:

$$QCRP = \Sigma QRP_{R1 \ldots Rp} \qquad \text{(EQN. 4)}$$

where $QRP_{Ri}$ is the QRP metric of the $i^{th}$ quantum relative performance metric of p quantum relative performance metrics associated with a quantum component.

A QRP metric may be calculated as a normalized quantum key performance indicator (QKPI) as:

$$QRP = \sim QKPI \qquad \text{(EQN. 5)}$$

As an example, a quantum service may be considered as one of many quantum-computing-as-a-service (QCaaS) services offered by a carrier. QCaaS may enable and optimize one or more of a plurality of functions, including at least one of: different requirements per service, quantum fidelity requirements, quantum purity requirements, quantum entanglement requirements (e.g., wherein when two particles in proximity in a shared quantum state, and the quantum state of one particle changes when the particles are physically separated, the quantum state of the other particle will also instantly change), quantum memory requirements, quantum loss requirements, average connection time between nodes, priority requirements, network topology that dynamically changes, transport medium per path (e.g., satellite free-space in a vacuum, optical fiber, etc.), access medium (e.g., 6G free spaces optics such as LiFi, microwave, etc.), time dependent or time independent quantum super dense coding requirements, and/or other functions.

Figure 3:
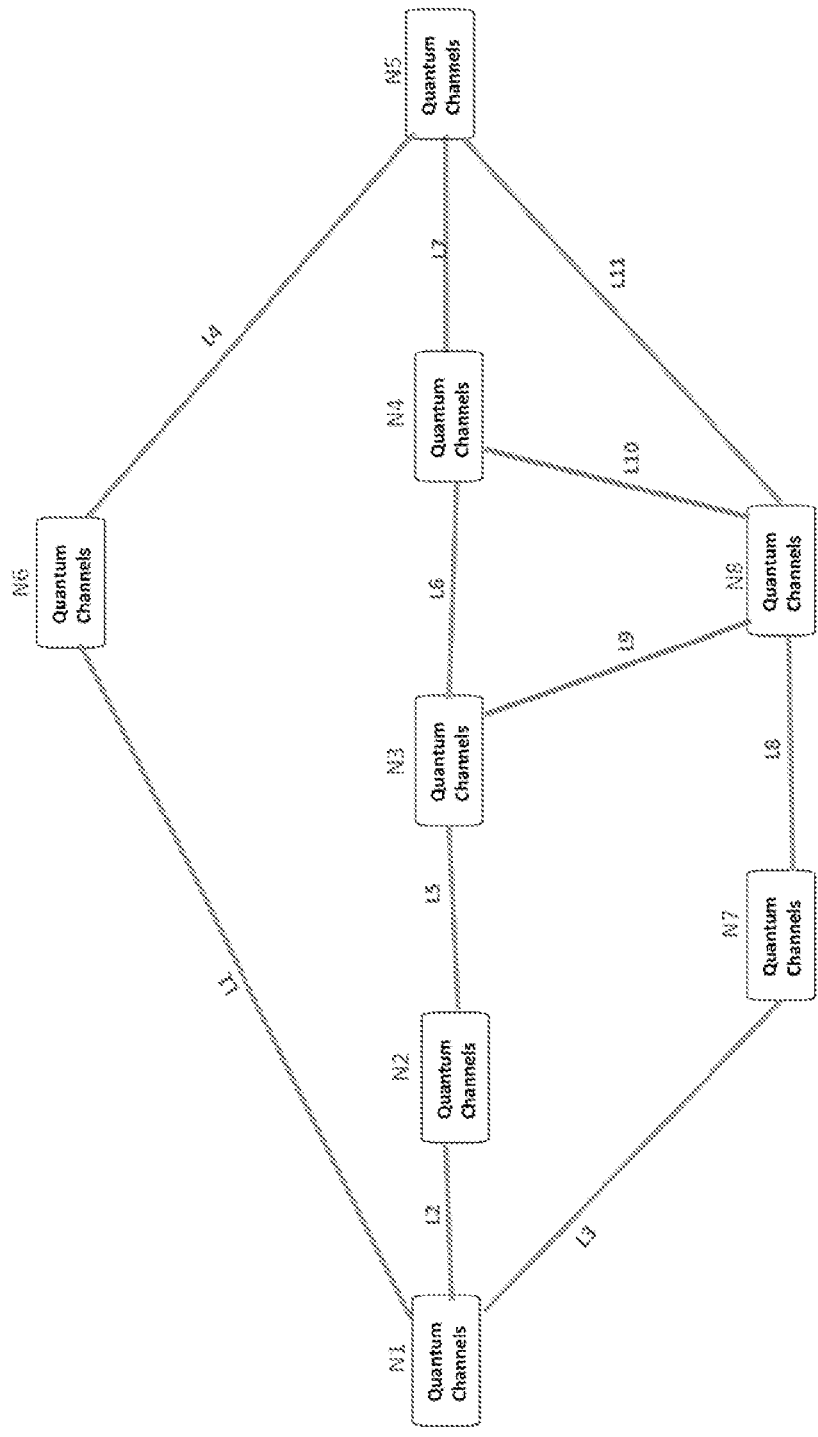
FIG. 3 illustrates an example network including a plurality of network nodes comprising quantum channels and connected by a plurality of links.

FIG. 3, for instance, illustrates an example network 300 including a plurality of network nodes N1-N8 comprising quantum channels and connected by a plurality of links L1-L11. The network nodes N1-N8 may comprise, for instance, application programs, APIs, application servers, security servers, data repositories/lakes, routers, switches, load balancers, links, other network nodes, and/or a combination thereof. A plurality of different end-to-end paths from network node N1 to network node N5 are possible, including a first path that connects network node N1 to network node N6 (via link L1) and network node N6 to network node N5 (via link L4). A second path may connect network node N1 to network node N2 (via link L2), network node N2 to network node N3 (via link L5), network node N3 to network node N4 (via link L6), and network node N4 to network node N5 (via link L7). A third path may connect network node N1 to network node N7 (via link L3), network node N7 to network node N8 (via link L8), and network node N8 to network node N5 (via link L11). A fourth path may connect network node N1 to network node N7 (via link L3), network node N7 to network node N8 (via link L8), network node N8 to network node N4 (via link L10), and network node N4 to network node N5 (via link L7).

One approach to optimizing the paths through the network 300 may be based on the physical path distance and/or number of hops in the path. For instance, although the first path may comprise the fewest hops (i.e., two), the first path may also comprise the longest path (physically) due to network node N6 comprising a satellite node. The second path may comprise the greatest number of hops (i.e., four). The third path may comprise a medium number of hops (i.e., three, more than the first path but fewer than the second path) and a medium length path (i.e., shorter than the first path but longer than the second path). The fourth path may comprise an alternate path. In another example, path optimization may be based on the utilization of the network nodes comprising the path endpoints and/or intermediate points (e.g., least busy endpoints and/or intermediate points, either individually or in the aggregate). For instance, even in classical terms, if a network node is at seventy percent utilization, any further linear increase in sustained utilization may result in exponential delay increases.

Figure 4A:
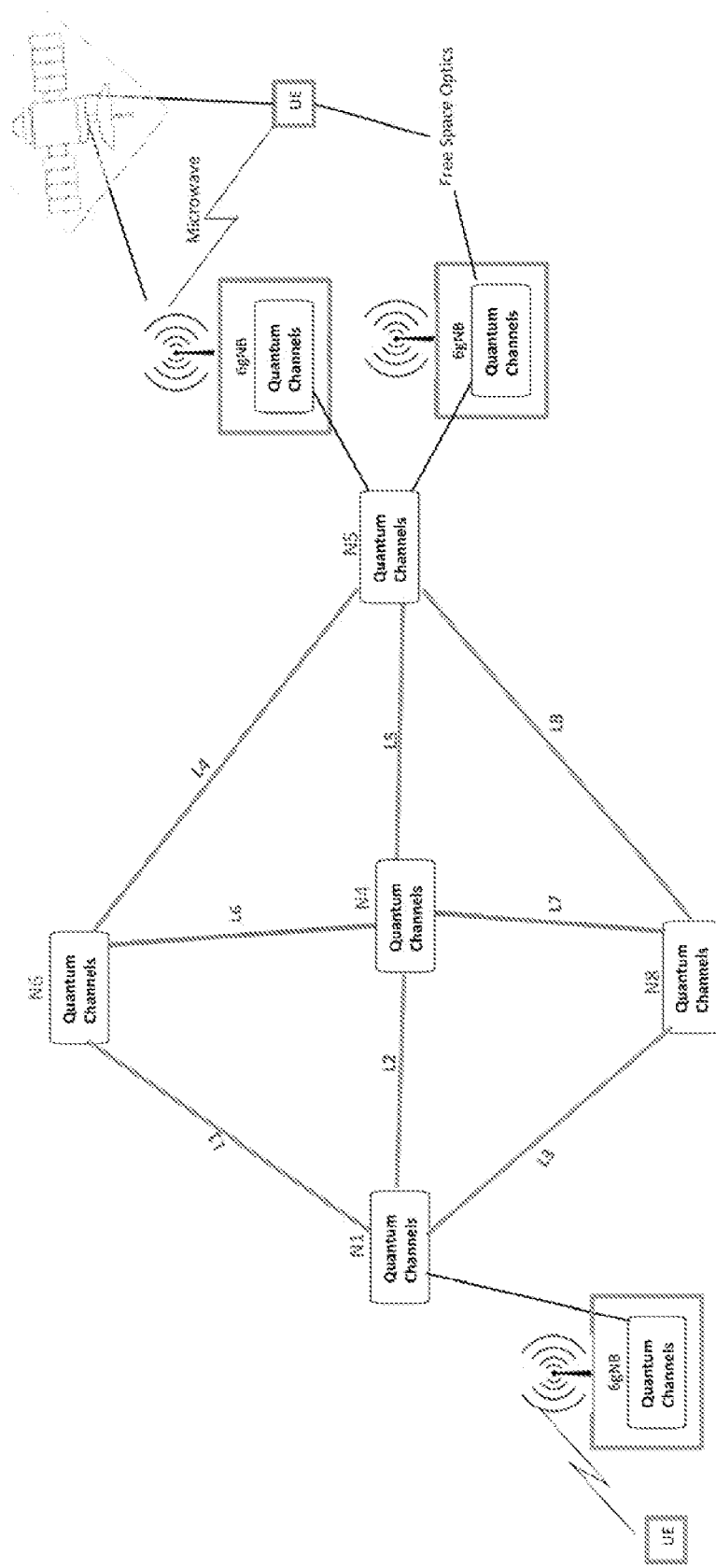
FIG. 4A illustrates an example of paths through the network of FIG. 3 that may include sixth generation radio access network access nodes and user endpoint devices with quantum channels over free space optics and microwave access networks.
Figure 4B:
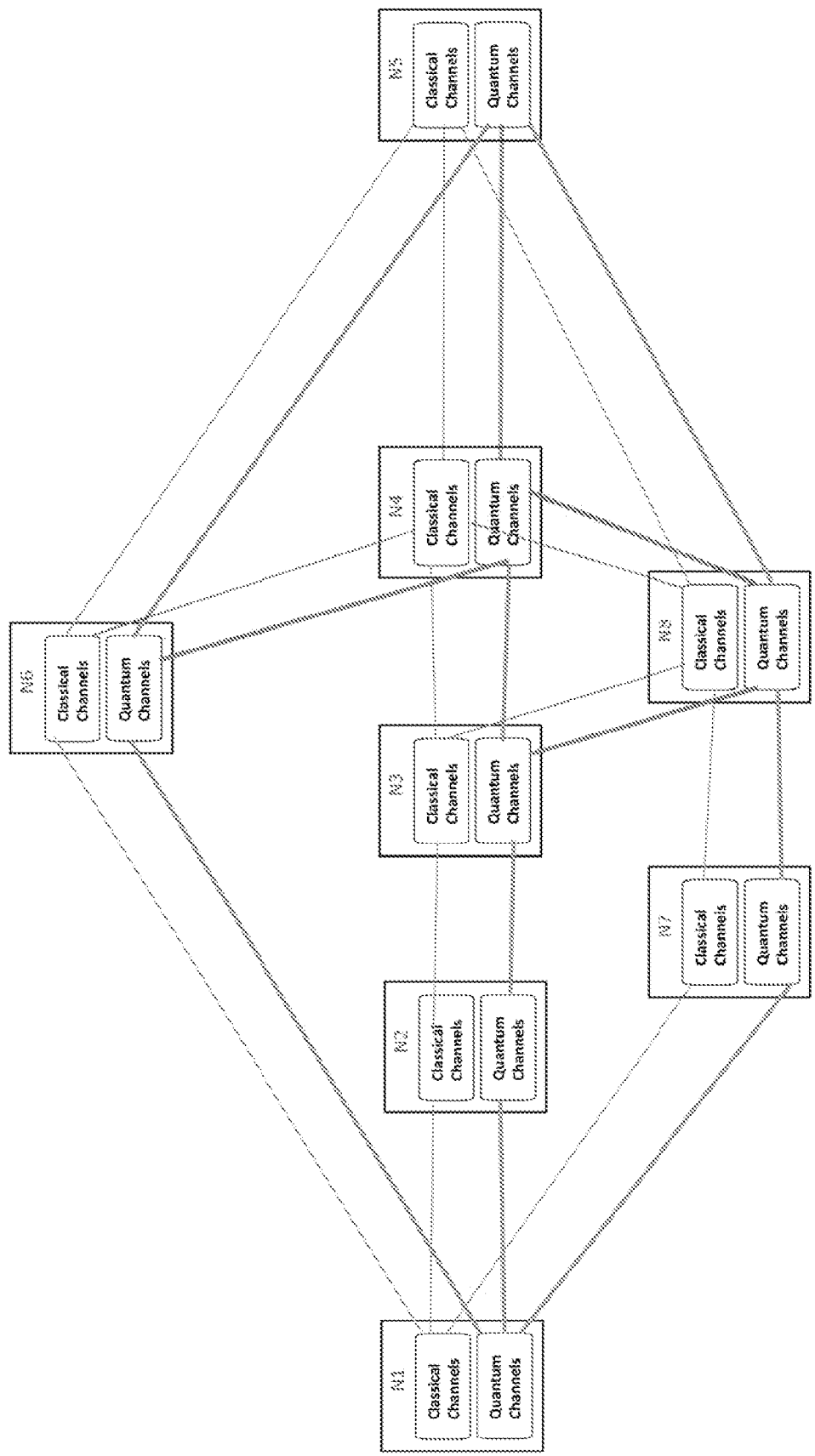
FIG. 4B illustrates an example of paths through the network of FIG. 3 where quantum channels and classical channels may coexist in the network nodes.

The network 300 may comprise an entirety of a telecommunications network, or may comprise only a subnet (e.g., a local, regional, national, international, satellite, or the like subnet) of a larger telecommunications network. FIG. 4A illustrates an example of paths through the network 300 that may include 6G RAN access nodes and user endpoint (UE) devices with quantum channels over free space optics (e.g., LiFi) and microwave access networks. FIG. 4B illustrates an example of paths through the network 300 where quantum channels and classical channels may coexist in the network nodes N1-N8.

Based on the path examples of FIGS. 3 and 4A-4B, quantum entanglement, super dense coding, and purity may be important performance parameters for real-time compute service or other types of service, whereas quantum loss may be an important performance parameter for a holographic video service or other services. Thus, in this example, the QCRP metric for a given network node N1-N8 may be computed to apply larger weights to relative quantum entanglement, super dense coding, and purity measurements (e.g., after being mapped by the RL manager 118) and smaller weight to the relative qubit loss measurement (e.g., after being mapped by the RL manager 118) when the given network node N1-N8 is utilized in connection with handling traffic for a real-time compute service.

Conversely, following the same example, the QCRP metric for the given network node N1-N8 may be computed to apply smaller weights to the relative quantum entanglement, super dense coding, and purity measurements (e.g., after being mapped by the RL manager 118) and a larger weight to the relative qubit loss measurement (e.g., after being mapped by the RL manager 118) when the given network node N1-N8 is utilized in connection with handling traffic for a holographic video service.

Returning to FIG. 2, in step 206, the processing system may identify a proposed new configuration for the hybrid quantum-classical telecommunications network. In one example, the proposed new configuration may alter the value of at least one configuration parameter of the hybrid quantum-classical telecommunications network (i.e., from a first value associated with the current configuration of the hybrid quantum-classical telecommunications network to a second, different value). In one example, the configuration parameter whose value is changed may relate to at least one of: requirements per service, quantum fidelity requirements, quantum purity requirements, quantum entanglement requirements (e.g., wherein when two particles in proximity in a shared quantum state, and the quantum state of one particle changes when the particles are physically separated, the quantum state of the other particle will also instantly change), quantum memory requirements, quantum loss requirements, average connection time between nodes, priority requirements, network topology that dynamically changes, transport medium per path (e.g., satellite free-space in a vacuum, optical fiber, etc.), access medium (e.g., 6G free spaces optics such as LiFi, microwave, etc.), time dependent or time independent quantum super dense coding requirements, and/or other functions of the hybrid quantum-classical telecommunications network.

In step 208, the processing system may calculate the quantum network relative performance (QNRP) metric for the proposed new configuration of the hybrid quantum-classical telecommunications network. In other words, the QNRP may be calculated as described above in EQN. 1, but this time utilizing a second set of configuration parameter values associated with the proposed new configuration of the hybrid quantum-classical telecommunications network. As discussed above, in one example, the value for at least one configuration parameter in the proposed new configuration is different from the value for the same configuration parameter in the current configuration.

In step 210, the processing system may determine, based on the calculating of steps 204 and 208, whether the quantum network relative performance (QNRP) metric for the proposed new configuration of the hybrid quantum-classical telecommunications network is greater (e.g., better performance) than the quantum network relative performance (QNRP) metric for the current configuration of the hybrid quantum-classical telecommunications network.

If the processing system determines in step 210 that the quantum network relative performance (QNRP) metric for the proposed new configuration of the hybrid quantum-classical telecommunications network is greater (e.g., better performing) than the quantum network relative performance (QNRP) metric for the current configuration of the hybrid quantum-classical telecommunications network, then the method 200 may proceed to step 212. In step 212, the processing system may implement the proposed new configuration in the hybrid quantum-classical telecommunications network. That is, the processing system may modify the value of at least one configuration parameter of the hybrid quantum-classical telecommunications network (e.g., from a value of the first set of values to a value of the second set of values).

If, on the other hand, the processing system determines in step 210 that the quantum network relative performance (QNRP) metric for the proposed new configuration of the hybrid quantum-classical telecommunications network is not greater than the quantum network relative performance (QNRP) metric for the current configuration of the hybrid quantum-classical telecommunications network, then the method 200 may proceed to step 214. In step 214, the processing system may leave the current configuration of the hybrid quantum-classical telecommunications network as is. That is, the processing system may leave all values of all configuration parameters of the hybrid quantum-classical telecommunications network unchanged (at least until a new configuration that achieves a greater QNRP metric is proposed).

Having either implemented the new configuration for the hybrid quantum-classical telecommunications network or left the current configuration unchanged, the method 200 may end in step 216. However, all or part of the method 200 may be repeated as new configurations for the hybrid quantum-classical telecommunications network are proposed and/or varying network conditions cause fluctuations in the QNRP of the current configuration.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 5 depicts a high-level block diagram of a computing device or processing system specifically programmed to perform the functions described herein. As depicted in FIG. 5, the processing system 500 comprises one or more hardware processor elements 502 (e.g., at least one central processing unit (CPU), a microprocessor, or a multi-core processor), a memory 504 (e.g., random access memory (RAM) and/or read only memory (ROM)), a module 505 for optimizing a hybrid quantum-classical network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 505 for optimizing a hybrid quantum-classical network (e.g., a software program comprising computer-executable instructions) can be loaded into memory 504 and executed by hardware processor element 502 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for optimizing a hybrid quantum-classical network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
calculating, by a processing system including at least one processor, a quantum network relative performance metric for a current configuration of a hybrid quantum-classical telecommunications network;
identifying, by the processing system, a proposed new configuration for the hybrid quantum-classical telecommunications network;
calculating, by the processing system, the quantum network relative performance metric for the proposed new configuration of the hybrid quantum-classical telecommunications network; and
implementing, by the processing system, the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network, wherein the implementing comprises modifying a topology of the hybrid quantum-classical telecommunications network based on the proposed new configuration.

2. The method of claim 1, wherein the current configuration of the hybrid quantum-classical telecommunications network utilizes a first set of values for configuration parameters of the hybrid quantum-classical telecommunications network, and the proposed new configuration for the hybrid quantum-classical telecommunications network utilizes a second set of values for the configuration parameters of the hybrid quantum-classical telecommunications network, wherein a second value of at least one configuration parameter of the configuration parameters in the second set of values is different from a first value of the at least one configuration parameter in the first set of values.

3. The method of claim 2, wherein the modifying the topology comprises changing the at least one configuration parameter from the first value to the second value.

4. The method of claim 2, wherein the configuration parameters of the hybrid quantum-classical telecommunications network relate to at least one of: requirements per service, quantum fidelity requirements, quantum purity requirements, quantum entanglement requirements, quantum memory requirements, quantum loss requirements, average connection time between nodes of the hybrid quantum-classical telecommunications network, priority requirements, the topology of the hybrid quantum-classical telecommunications network, a transport medium per path through the hybrid quantum-classical telecommunications network, an access medium, time dependent quantum super dense coding requirements, or time independent quantum super dense coding requirements.

5. The method of claim 1, wherein the quantum network relative performance metric is based on a respective weighting profile associated with at least one of: a quality of service, an application, a service, a priority, or a cost.

6. The method of claim 1, wherein the quantum network relative performance metric is calculated as a sum of a plurality of weighted quantum network service relative performance metrics for a plurality of services supported by the hybrid quantum-classical telecommunications network.

7. The method of claim 6, wherein a quantum network service relative performance metric for a given service of the plurality of services is calculated as a sum of a plurality of quantum path relative performance metrics for a plurality of paths utilized by the given service.

8. The method of claim 7, wherein a quantum path relative performance metric for a given path of the plurality of paths is calculated as a sum of a plurality of quantum component relative performance metrics for a plurality of components of the given path.

9. The method of claim 8, wherein a quantum component relative performance metric for a given component of the plurality of components is calculated as a sum of a plurality of quantum relative performance metrics for the given component.

10. The method of claim 9, wherein a quantum relative performance metric for the given component is calculated as a normalized quantum key performance indicator of the hybrid quantum-classical telecommunications network.

11. The method of claim 8, wherein a quantum component relative performance metric for a given component of the plurality of components assigns respective weights to a plurality of quantum relative performance metrics based on respective importances of the plurality of quantum relative performance metrics to a service supported by the given component of the plurality of components.

12. The method of claim 6, wherein a subset of weights of the plurality of weighted quantum network service relative performance metrics for a given service of the plurality of services is determined by a policy stored in a database.

13. The method of claim 1, wherein the calculating the quantum network relative performance metric for the current configuration of the hybrid quantum-classical telecommunications network and the calculating the quantum network relative performance metric for the proposed new configuration of the hybrid quantum-classical telecommunications network are performed using a quantum-classical graph neural network.

14. The method of claim 13, wherein the quantum-classical graph neural network is trained on a dataset comprising: normalized quantum key performance indicators for the hybrid quantum-classical telecommunications network, quantum key performance indicators for another network having a similar topology to a topology of the hybrid quantum-classical telecommunications network, and performance metrics for the another network.

15. The method of claim 1, wherein a reinforcement learning is utilized to learn an optimal behavior of the hybrid quantum-classical telecommunications network.

16. The method of claim 15, wherein the reinforcement learning is used to perform at least one of: repairing a route through the hybrid quantum-classical telecommunications network, restoring a connectivity in a portion of the hybrid quantum-classical telecommunications network, re-routing network traffic around at least one disrupted node in the hybrid quantum-classical telecommunications network, restoring entanglement in the hybrid quantum-classical telecommunications network, restoring quantum computing as a service functionality in the hybrid quantum-classical telecommunications network, or restoring a quantum network as a service functionality in the hybrid quantum-classical telecommunications network.

17. The method of claim 1, wherein the hybrid quantum-classical telecommunications network supports at least one of: quantum computing as a service, quantum network as a service, or quantum security as a service.

18. The method of claim 1, wherein the topology comprises a plurality of network nodes connected by a plurality of links, and wherein each network node of the plurality of network nodes comprises a quantum channel and is at least one of: an application program, an application programming interface, an application server, a security server, a data repository, a data lake, a router, a switch, or a load balancer.

19. A non-transitory computer-readable medium storing instructions which, when executed by a processing system including at least one processor, cause the processing system to perform operations, the operations comprising:

calculating a quantum network relative performance metric for a current configuration of a hybrid quantum-classical telecommunications network;

identifying a proposed new configuration for the hybrid quantum-classical telecommunications network;

calculating the quantum network relative performance metric for the proposed new configuration of the hybrid quantum-classical telecommunications network; and implementing the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network, wherein the implementing comprises modifying a topology of the hybrid quantum-classical telecommunications network based on the proposed new configuration.

20. A device comprising:

a processing system including at least one processor; and a non-transitory computer-readable medium storing instructions which, when executed by the processing system, cause the processing system to perform operations, the operations comprising:

calculating a quantum network relative performance metric for a current configuration of a hybrid quantum-classical telecommunications network;

identifying a proposed new configuration for the hybrid quantum-classical telecommunications network;

calculating the quantum network relative performance metric for the proposed new configuration of the hybrid quantum-classical telecommunications network; and implementing the proposed new configuration in the hybrid quantum-classical telecommunications network when the quantum network relative performance metric for the proposed new configuration of the hybrid quantum-classical telecommunications network is greater than the quantum network relative performance metric for the current configuration of the hybrid quantum-classical telecommunications network, wherein the implementing comprises modifying a topology of the hybrid quantum-classical telecommunications network based on the proposed new configuration.

\* \* \* \* \*